United States Patent
Fukushima et al.

(10) Patent No.: US 9,224,414 B2
(45) Date of Patent: Dec. 29, 2015

(54) METHOD FOR MANUFACTURE OF MAGNETIC RECORDING MEDIUM AND MAGNETIC RECORDING AND REPRODUCTION DEVICE

(75) Inventors: Masato Fukushima, Ichihara (JP);
Akira Sakawaki, Ichihara (JP);
Katsumasa Hirose, Ichihara (JP)

(73) Assignee: SHOWA DENKO K.K., Tokyo (JP)

( * ) Notice: Subject to any disclaimer, the term of this patent is extended or adjusted under 35 U.S.C. 154(b) by 1749 days.

(21) Appl. No.: 12/438,091

(22) PCT Filed: Aug. 22, 2007

(86) PCT No.: PCT/JP2007/066697
§ 371 (c)(1),
(2), (4) Date: May 20, 2009

(87) PCT Pub. No.: WO2008/026610
PCT Pub. Date: Mar. 6, 2008

(65) Prior Publication Data
US 2010/0053797 A1    Mar. 4, 2010

(30) Foreign Application Priority Data
Aug. 28, 2006 (JP) .................................. 2006-230194

(51) Int. Cl.
*B44C 1/22* (2006.01)
*G11B 5/855* (2006.01)

(52) U.S. Cl.
CPC ...................................... *G11B 5/855* (2013.01)

(58) Field of Classification Search
None
See application file for complete search history.

(56) References Cited

U.S. PATENT DOCUMENTS

| 4,030,942 A * | 6/1977 | Keenan et al. ................ 438/526 |
| 6,331,364 B1 | 12/2001 | Baglin et al. |
| 7,067,207 B2 | 6/2006 | Kamata et al. |
| 7,147,790 B2 | 12/2006 | Wachenschwanz et al. |
| 2005/0036223 A1 | 2/2005 | Wachenschwanz et al. |

FOREIGN PATENT DOCUMENTS

| JP | 05-205257 A | 8/1993 |
| JP | 2001-250217 A | 9/2001 |

(Continued)

OTHER PUBLICATIONS

Ahn et al, Fabrication of subwavelength aluminum wire grating using nanoimprint lithography and reactive ion etching, Jan. 2005, microelectronic engineering, p. 314-318.*

(Continued)

*Primary Examiner* — Binh X Tran
*Assistant Examiner* — David Cathey, Jr.
(74) *Attorney, Agent, or Firm* — Sughrue Mion, PLLC

(57) ABSTRACT

A method for manufacturing a magnetic recording medium includes the steps of depositing a magnetic layer on at least one of surfaces of a nonmagnetic substrate and injecting atoms partially in the magnetic layer, thereby demagnetizing parts having admitted the injected atoms or imparting amorphousness thereto, to form a magnetically separated magnetic recording pattern. The step of injecting includes the steps of applying resist to the at least one surface subsequent to the step of depositing, partially decreasing a thickness of the resist and irradiating a surface of the resist with atoms, thereby inducing partial injection of the atoms to the magnetic layer through portions of the resist decreased in thickness.

9 Claims, 1 Drawing Sheet

(56) References Cited

FOREIGN PATENT DOCUMENTS

| | | |
|---|---|---|
| JP | 2004-164692 A | 6/2004 |
| JP | 2004-178793 A | 6/2004 |
| JP | 2004-178794 A | 6/2004 |
| JP | 2005-293633 A | 10/2005 |

OTHER PUBLICATIONS

Nanocham, Nanocharm Glossary of Terms, Apr. 6, 2013, Nanocharm, p. 1-9.*

Edi Suharyadi, et al., "Fabrication of Patterned Co/Pd Nanostructures Using E-Beam Lithography and Ga Ion-Irradiation," IEICE Technical Report, 2006, pp. 21-26, MR2005-55 (Feb. 2006).

* cited by examiner

METHOD FOR MANUFACTURE OF MAGNETIC RECORDING MEDIUM AND MAGNETIC RECORDING AND REPRODUCTION DEVICE

CROSS REFERENCE TO RELATED APPLICATION

This application is an application filed under 35 U.S.C. §111(a) claiming the benefit pursuant to 35 U.S.C. §119(e)(1) of the filing date of Japanese Patent Application No. 2006-230194 filed Aug. 28, 2006 pursuant to 35 U.S.C. §111(b).

TECHNICAL FIELD

This invention relates to a method for the manufacture of a magnetic recording medium for use as in a hard disk drive and to a magnetic recording and reproduction device.

BACKGROUND ART

In recent years, as magnetic recording devices, such as magnetic disk drives, flexible disk drives and magnetic tape drives, have immensely expanded their ranges of utility and gained in significance, efforts have been directed toward enabling the magnetic recording media used in these devices to be prominently improved in recording density. Particularly, the increase in surface recording density has been further growing in ardency since the introduction of the Magneto Resistive (MR) head and the Partial Response Maximum Likelihood (PRML) technique. Owing to the further introduction of the Giant-Magneto Resistive (GMR) head and the Tunneling Magnet Resistive (TMR) head in recent years, the increase is continuing at a pace of about 100% per year. These magnetic recording media are being urged to attain a still higher recording density in future and their magnetic recording layers to accomplish addition to coercive force, Signal-to-Noise Ratio (SNR) and resolution. Recent years have been witnessing efforts that are being continued with the object of enhancing the linear recording density and adding to the surface recording density by increasing the track density as well.

In the latest magnetic recording devices, the track density has reached 110 kTPI. As the track density is further increased, it tends to entail such problems as causing interference between the parts of information magnetically recorded in adjacent tracks and inducing the magnetization transition region in the borderline region to constitute a noise source and impair the SNR. This fact hinders the enhancement of the recording density because it immediately results in lowering the bit error rate.

For the sake of increasing the surface recording density, it is necessary that the individual recording bits on the magnetic recording medium be formed in as minute a size as possible and enabled to secure as large saturated magnetization and magnetic film thickness as permissible. As the recording bits further decrease in size, however, they tend to entail such problems as lessening the minimum volume of magnetization per bit and inducing extinction of recorded data through the magnetization reversal caused by thermal fluctuation.

Further, since the track pitch grows small, the magnetic recording device necessitates a track servo technique of extremely high accuracy and, at the same time, generally needs adoption of the method of executing the recording in a large width and executing the reproduction in a smaller width than during the recording with a view to eliminating the influence from the adjacent tracks to the fullest possible extent. Notwithstanding that this method is capable of suppressing the influence between the adjacent tracks to a minimum, it entails such problems as rendering sufficient acquisition of the output of reproduction difficult and consequently incurring difficulty in securing a sufficient SNR.

As one means to cope with the problem of thermal fluctuation and accomplish acquisition of a due SNR or a sufficient output, an attempt to enhance the track density by forming irregularities along the tracks on the surface of the recording medium and consequently physically separating mutually the adjacent tracks is now under way. This technique will be referred to as a "discrete track technique" and the magnetic recording media that are produced by this technique will be referred to as "discrete track media" herein below.

As one example of the discrete track medium, a magnetic recording medium that is formed on a nonmagnetic substrate bestowed on the surface thereof with irregular patterns and enabled to acquire physically separated magnetic recording track and servo signal pattern has been known (refer, for example, to JP-A 2004-164692).

This magnetic recording medium has a ferromagnetic layer formed on the surface of a substrate possessing a plurality of irregularities on the surface thereof via a soft magnetic layer and has a protecting film formed on the surface of the ferromagnetic layer. This magnetic recording medium has formed in the convexed regions thereof magnetic recording regions magnetically divided from the environments.

According to this magnetic recording medium, it is held that a high-density magnetic recording medium issuing no great noise can be formed because the fact that the occurrence of magnetic walls in a soft magnetic layer can be suppressed results in preventing the influence of thermal fluctuation from readily appearing and allowing extinction of interference between the adjacent signals.

The discrete track technique is known in two kinds, i.e. a method which forms a track subsequent to forming a magnetic recording medium consisting of a number of stacked thin films and a method which forms a thin-film magnetic recording medium either directly on the surface of a substrate or subsequent to forming irregular patterns on a thin-film layer ready for the formation of a track (refer, for example, to JP-A 2004-178793 and JP-A 2004-178794). The former method, often called a magnetic layer processing-type method, is at a disadvantage in suffering the medium to be readily contaminated during the course of production and greatly complicating the process of production as well because it requires the physical processing of surfaces to be carried out subsequent to the formation of the medium. The latter method, often called an emboss processing-type method, though not inducing ready contamination during the course of production, is at a disadvantage in disabling stabilization of the posture and the height of floatation of the recording and reproducing head adapted to execute recording and reproducing while floating on the medium because the irregular shape formed on the substrate is fated to continue existence on the film to be formed.

A method for forming regions intervening between magnetic tracks of a discrete track medium by injecting nitrogen ions or oxygen ions or radiating a laser into a preformed magnetic layer has been disclosed (refer to JP-A HEI 5-205257). The regions between the magnetic tracks that are formed by this method, however, suffer survival of insufficiently magnetized state because of high coercive force in spite of low saturated magnetization and incur the trouble of inducing blurred portions in the data written in the magnetic tracks.

Further, in the manufacture of the so-called patterned medium having magnetic recording patterns disposed with definite regularity per bit, the formation of magnetic recording patterns by etching due to radiation of ions or by imparting amorphousness to the magnetic layer has been disclosed (refer to Technical Report of IEICE, MR2005-55 (2006-2), pp. 21-26 (The Institute of Electronics, Information and Communication Engineers) and U.S. Pat. No. 6,331,364). This method, however, has entailed the problem that the magnetic recording medium incurs contamination and the surface thereof suffers decline of flatness during the course of manufacture and the problem that the irradiation with ions brings about no sufficient demagnetization of the magnetic layer and the irradiation with ions inflicts damage on the magnetic layer and induces decline of flatness of the surface thereof.

This invention, in a magnetic recording medium encountering technical difficulty in consequence of addition to recording density, is directed to eliminating the blurring of the data during the magnetic recording and consequently adding to the areal recording density by markedly increasing the recording density and suppressing the coercive force in the regions between the magnetic recording pattern portions and the residual magnetization to the fullest possible extent while retaining the recording and reproducing properties at least above the conventional level. Particularly with respect to the discrete track-type magnetic recording medium that imparts the undulation subsequent to the deposition of the magnetic layer on the substrate, this invention contemplates providing a method of manufacture that decisively simplifies the procedure of manufacture by excluding the step of demagnetizing the magnetic layer and precluding occurrence of noticeable contamination and a useful magnetic recording medium abounding in surface smoothness and excelling in the property of buoyancy.

DISCLOSURE OF THE INVENTION

With a view to soling the problems mentioned above, the inventors have continued a diligent study and consequently perfected the present invention.

The present invention provides as the first aspect thereof a method for manufacturing a magnetic recording medium, comprising steps of depositing a magnetic layer on at least one of surfaces of a nonmagnetic substrate and injecting atoms partially in the magnetic layer, thereby demagnetizing parts having admitted the injected atoms or imparting amorphousness thereto, to form a magnetically separated magnetic recording pattern, wherein the step of injecting includes the steps of applying resist to the at least one surface subsequent to the step of depositing, partially decreasing a thickness of the resist and irradiating a surface of the resist with atoms, thereby inducing partial injection of the atoms to the magnetic layer through portions of the resist decreased in thickness.

In the second aspect of the invention that includes the method for manufacturing a magnetic recording medium according to the first aspect, the step for partially decreasing is accomplished by transferring to the surface of the resist a convexo-concave shape formed on a surface of a stamp.

In the third aspect of the invention that includes the method for manufacturing a magnetic recording medium according to the first aspect, the step for partially decreasing is accomplished by partially etching the surface of the resist.

In the fourth aspect of the invention that includes the method for manufacturing a magnetic recording medium according to the first aspect, the portions of the resist decreased in thickness have a thickness in a range of 1 nm to 150 nm.

In the fifth aspect of the invention that includes the method for manufacturing a magnetic recording medium according to the first aspect, the portions of the resist decreased in thickness have a width of 100 nm or less and other portions of the resist have a width of 2000 nm or less.

The sixth aspect of the invention that includes the method for manufacturing a magnetic recording medium according to the first aspect further comprises the step of forming a protective layer on the magnetic layer before the step of applying, wherein the resist is applied onto the protective layer.

In the seventh aspect of the invention that includes the method for manufacturing a magnetic recording medium according to the first aspect, the atoms injected are those of at least one element selected from the group consisting of B, P, Si, F, N, H, C, In, Bi, Kr, Ar, Xe, W, As, Ge, Mo and Sn.

In the eighth aspect of the invention that includes the method for manufacturing a magnetic recording medium according to the seventh aspect, wherein the atoms injected are those of the Kr or Si.

In the ninth aspect of the invention that includes the method for manufacturing a magnetic recording medium according to the first aspect, the magnetic layer has a thickness in a range of 3 to 20 nm.

The tenth aspect of the invention provides a magnetic recording and reproduction device comprising in combination the magnetic recording medium manufactured by the method according to any one of claims 1 to 9, a driving part for driving the magnetic recording medium in a recording direction, a magnetic head composed of a recording part and a regenerating part, means to move the magnetic head relative to the magnetic recording medium, and a recording and regenerating signal processing means for inputting a signal to the magnetic head and regenerating an output signal from the magnetic head.

This invention, in a magnetic recoding medium adapted to form a magnetic recording pattern subsequent to the deposition of a magnetic layer on a nonmagnetic substrate, enables providing a magnetic recording medium securing stability of buoyancy of a head, possessing an excellent ability to separate magnetic recording patterns, succumbing to no influence of signal interference between the adjacent patterns and excelling in the property of high recording density. It can greatly contribute to augmenting the productivity because it allows omitting the dry etching process for removing a magnetic layer in a die therefor heretofore held to entail an extremely complicated manufacturing process.

The magnetic recording and reproduction device of this invention excels in the property of buoyancy of a head and excels in the ability to separate magnetic recording patterns owing to the use of the magnetic recording medium contemplated by this invention. The magnetic recording and reproduction device of this invention excels in the property of high recording density because it is susceptible to no influence of the signal interference between the adjacent patterns.

The above and other objects, characteristic features of the present invention will become apparent to those skilled in the art from the description to be given herein below with reference to the accompanying drawings.

BEST MODE FOR CARRYING OUT THE INVENTION

Figure 1:
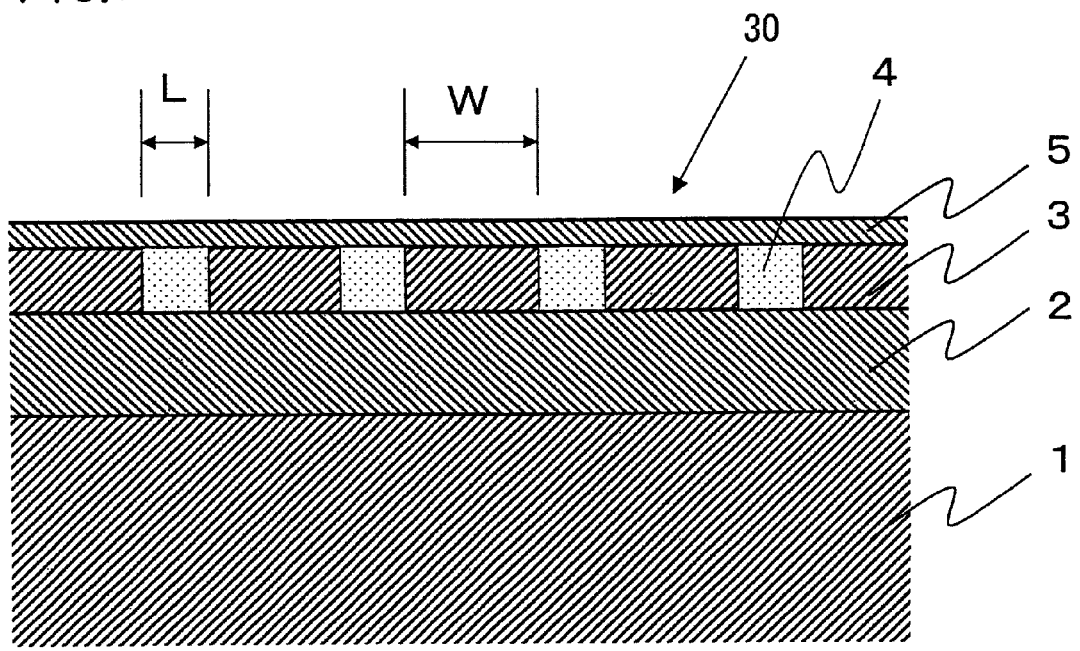
FIG. 1 is a cross section illustrating the structure of a magnetic recording medium obtained by the present invention.

This invention relates to a method for manufacturing a magnetic recording medium, comprising the steps of depositing a magnetic layer on at least one surface of a non-magnetic substrate and then partially injecting atoms into the magnetic layer, thereby demagnetizing the portions of the magnetic layer having admitted the injected atoms or imparting amorphousness thereto and allowing formation of magnetically separated magnetic recording patterns, wherein the step of partially injecting atoms into the magnetic layer comprises applying resist to the surface subsequent to the formation of the magnetic layer, partially decreasing the thickness of the layer of resist and irradiating the surface of the resist with atoms, thereby allowing the atoms to be injected into the magnetic layer through the portions of the resist of decreased thickness.

In the step of partially injecting atoms into the magnetic layer, when the resist is left behind in only the portions of the magnetic layer not expected to admit the atoms and the resist is completely removed from the portions expected to admit the atoms, this work entails the trouble that the atoms efficiently injected into the magnetic layer will inflict damage to the magnetic layer and will etch the layer.

This inventors, while pursuing a study with a view to solving this problem, have discovered that by allowing the resist to thinly remain in the portions of the magnetic layer expected to admit ions instead of completely removing the resist, it is made possible to markedly alleviate the damage on the portions of the magnetic layer to admit ions, accomplish demagnetizing the magnetic layer of the portions or imparting amorphousness thereto, and retain the surface flatness of the portions intact. Now, this invention will be described in detail herein below.

This invention relates to a magnetic recording medium provided on at least one surface of the non-magnetic substrate with a magnetically separated magnetic recording pattern and produced by causing the non-magnetic part serving to magnetically separate the magnetic recording pattern parts to result from injecting atoms into the magnetic layer already formed. The method of this invention for manufacturing the magnetic recording medium, in the magnetic separation of the magnetic recording pattern parts, excludes the step of physically separating the magnetic recording pattern as by dry etching or stamping work as used by the conventional manufacturing method.

The term "magnetic recording pattern part" as used in this invention embraces the so-called patterned medium having magnetic recording patterns disposed with a definite regularity for each bit, the medium having magnetic recording patterns disposed in the form of a track and other servo signal patterns.

This invention prefers to be applied, among other media enumerated above, particularly to the so-called discrete type magnetic recording medium, in which the magnetically separated magnetic recording patterns comprise magnetic recording tracks and servo signal patterns, on account of the convenience of manufacture.

This invention will be described below by reference, for example, to the discrete type magnetic recording medium.

FIG. 1 illustrates the cross-sectional structure of the discrete type magnetic recording medium of this invention. A magnetic recording medium 30 of this invention has formed on the surface of a non-magnetic substrate 1 a soft magnetic layer, an intermediate layer 2, a magnetic layer 3 having magnetic patterns formed thereon, a non-magnetic layer 4 and a protective layer 5 and has further formed on the outermost surface thereof with a lubricating layer omitted from illustration.

With the object of augmenting the recording density, the magnetic layer 3 provided with the magnetic pattern prefers to have a magnetic part width W of 200 nm or less and a non-magnetic part width L of 100 nm or less. The track pitch P(=W+L), therefore, prefers to be decreased to the fullest possible extent within the range of 300 nm or less with a view to heightening the recording density. To fulfill this scheme, it suffices to effect the injection of atoms while keeping the thicker width of the resist at 200 nm or less similarly to the width W and the thinner width thereof to 100 nm or less similarly to the width L.

As the non-magnetic substrate to be used in this invention, any of various non-magnetic substrates, such as Al alloy substrates made of Al—Mg alloy having Al as a main component and substrates made of crystallized glass like ordinary soda glass and aluminosilicate glass, silicon, titanium, ceramics and various resins. Among the examples cited above, Al alloy substrates and substrates made of glass, such as crystallized glass, and of silicon are used particularly favorably. The average surface roughness (Ra) of the substrate is expected to be 1 nm or less, preferably 0.5 nm or less, and particularly preferably 0.1 nm or less. This invention forms on the surface of this substrate an FeCoB layer as a soft magnetic layer and an Ru layer as an intermediate layer. The soft magnetic layer and intermediate layer become necessary for the vertical beam type magnetic recording medium.

Though the magnetic layer of this invention does not discriminate between the in-plane magnetic recording layer and the vertical magnetic recording layer, it prefers the vertical magnetic recording layer for the sake of realizing high recording density. The magnetic recording layer mostly prefers to be formed of an alloy having Co as a main component.

For the magnetic recording layer for use in the in-plane magnetic recording medium, the stacked structure composed of a non-metallic CrMo under layer and a ferromagnetic CoCrPrTa magnetic layer can be adopted.

For the magnetic recording layer for use in the vertical magnetic recording medium, the product resulting from stacking a lining layer made of a soft magnetic FeCo alloy (such as FeCoB, FeCoSiB, FeCoZr, FeCoZrB or FeCoZrBCu, for example), an orientation controlling film made of Pt, Pd, NiCr or NiFeCr, optionally an intermediate film of Ru, and a magnetic layer made of a 70Co-15Cr-15Pt alloy (an alloy composed of 70 atom % of Co, 15 atom % of Cr and 15 atom % of Pt, the same applying hereinafter) or a 70Co-5Cr-15Pt-10SiO$_2$ alloy is available, for example.

The thickness of the magnetic recording layer is 3 nm or more and 20 nm or less, preferably 5 nm or more and 15 nm or more. The magnetic recording layer has to be so formed that it may acquire sufficient head input and output to suit the kind of the magnetic alloy to be used and the stacked structure. It must be set at the optimum level because it is required to exceed a certain level in order to acquire a certain level of output during the course of regeneration, whereas the various parameters governing the recording and reproducing properties are degraded in accordance as the output increases.

Generally, the magnetic recording layer is formed as a thin layer by the sputtering method.

This invention forms on this magnetic recording layer magnetically separated magnetic recording tracks and servo signal patterns. This step may be performed immediately subsequent to the formation of the magnetic recording layer or prior to the formation of the protective film layer 5 on the surface of the magnetic recording layer performed subsequent to the formation of the magnetic recording layer.

For the protective film layer 5, materials, such as carbonaceous substances like carbon (C), hydrogenated carbon ($H_xC$), carbon nitride (CN), amorphous carbon and silicon carbide (SiC), $SiO_2$, $Zr_2O_3$ and TiN, that are generally used for protective film layers are available. The protective film layer may be formed of two or more layers.

The thickness of the protective film layer must be 10 nm or less. This is because the thickness exceeding 10 nm unduly adds to the distance between the head and the magnetic layer and prevents acquisition of sufficient intensity of input signal. Generally, the protective film layer is formed by the sputtering method or the CVD method.

It is preferable to form on the protective film layer a lubricating layer. As the lubricant for use in the lubricating layer, fluorine-based lubricants, hydrocarbon-based lubricants and mixtures thereof are available. Generally, the lubricating layer is formed in a thickness of 1 to 4 nm.

Now, the step of forming magnetically separated magnetic recording tracks and servo signal patterns on the magnetic recording layer of this invention will be specifically described. While this step may be carried out immediately after the step for forming the magnetic recording layer, it may be carried out after the formation of the protective film layer on the surface of the magnetic recording medium. What follows is the step of inserting the step of providing the magnetic recording medium with magnetically separated magnetic recording tracks and servo signal patterns subsequent to the formation of the protective film layer on the surface of the magnetic recording layer.

This invention forms the magnetic recording layer of 70Co-5Cr-15Pt-10SiO$_2$ alloy and the protective layer of carbon. Thereafter, the magnetically separated magnetic recording tracks and servo signal patterns are formed on the surface of the protective layer by applying resist to the surface and subjecting the coated surface to the photolithographic technique.

This invention is characterized by partially decreasing the thickness of the resist and irradiating the surface of the resist with atoms, thereby causing the atoms to be partially injected into the magnetic layer through the portions of the resist having a decreased thickness. As a result, the surface of the magnetic recording medium exposed to the radiated atoms is protected and prevented from being etched by the radiated atoms and the surface is prevented from being damaged by the influence of gas in the chamber.

The method for partially decreasing the thickness of the resist as contemplated by this invention comprises preparing a stamp provided on the surface thereof with a concavo-convex pattern and pressing the stamp against the surface of the applied resist, thereby transferring the concavo-convex pattern to the surface of the resist. For example, after the liquid resist is applied to the surface of the protecting film and before the applied resist is allowed to dry, the concavo-convex pattern can be transferred to the surface of the resist by pressing the stamp provided on the surface thereof with the concavo-convex pattern against the surface of the still wet surface of the resist. In the case of optically transferring an etching pattern by the ordinary photolithographic technique and thereafter etching the optically transferred pattern, the method that comprises stopping the etching before it is completely finished and allowing the etched part of the resist to remain in a thinned state may be used.

This invention partially decreases the thickness of the resist by the method mentioned above. The thickness of the resin film is fixed by the energy of an ion beam, for example, which is used for the injection of atoms. Specifically, the radiated atoms do not reach the surface of the magnetic recording medium where the resist is thick but reaches the surface of the magnetic recording medium where the resist is thin and causes the portion to be demagnetized or endowed with amorphousness. Further, the surface of the magnetic recording medium irradiated with the atoms must keep the flatness prevented from being damaged by the ions. To fulfill this condition, the resist in the thick portion prefers to have a thickness in the range of 10 nm to 1000 nm and the resist in the thin portion prefers to have a thickness in the range of 1 nm to 150 nm.

Spin-on-Glass (SOG), for example, is used for the resist.

In this invention, when the atoms to be used for the ion beam technique, for example, are used, they are injected solely to the portion intervening between the recording tracks and the servo signal patterns. In this invention, when the atoms are injected into the magnetic recording layer, the atoms are ionized so as to facilitate acceleration. It is inferred that the ions are in a neutralized state while they are being injected into the magnetic recoding layer.

This invention is characterized by forming the non-magnetic part magnetically separating the magnetic recording tracks and the servo signal pattern parts by injecting atoms into the already formed magnetic layer to demagnetize this magnetic layer, with the result that the discrete track type magnetic recording medium will be manufactured. By having the discrete track type magnetic recording medium manufactured by this method, thereby suppressing the coercive force and the residual magnetism to the utmost limit, it is rendered possible to eliminate blurring during the course of magnetic recording and provide the magnetic recording medium with high areal recording density. This is because the injection of atoms into the magnetic layer results in changing the magnetic layer into a non-magnetic material and changing the crystalline structure of the magnetic layer and consequently causing the magnetic layer to lose magnetism or it is endowed with amorphousness to lose magnetism as will be specifically described herein below.

By manufacturing the discrete track type magnetic recording medium as described above, it is made possible to suppress the coercive force and the residual magnetism in the region between the magnetic tracks to the utmost limit and manufacture the magnetic recording medium of high areal recording density.

Further, this invention is characterized by enabling the non-magnetic part magnetically separating the magnetic recording tracks and the servo signal pattern parts to be formed by injecting atoms homogenously in the direction of thickness of the already formed magnetic layer to provid3 the magnetic layer with amorphousness.

The expression "providing the magnetic layer with amorphousness" as used in this invention refers to the change of the atomic arrangement of the magnetic layer into the form of irregular atomic arrangement lacking long-distance order, more specifically the state in which microcrystalline grains falling short of 2 nm in diameter are randomly arranged. When this state of atomic arrangement is examined by an analytical technique, the peak representing a crystalline face is not recognized and only a halo is recognized by the X-ray diffraction or electron diffraction.

By having the discrete track type magnetic recording medium manufactured by this method and consequently suppressing the coercive force and the residual magnetism in the region between the magnetic tracks to the utmost limit, it is made possible to eliminate blurring during the course of magnetic recording and provide the magnetic recording medium with high areal recording density.

The atoms to be injected by the ion beam technique, for example, in this invention, are preferably the atoms of at least one element selected from the group consisting of B, P, Si, F, N, H, C, In, Bi, Kr, Ar, Xe, W, As, Ge, Mo and Sn, more preferably the atoms of at least one element selected from the group consisting of B, P, Si, F, N, H and C or the atoms of at least one element selected from the group consisting of Si, In, Ge, Bi, Kr, Xe and W, and most preferably the Si or Kr atoms. When the atoms of O or N are used for the injection as disclosed in JP-A HEI 5-205257, since the O or N has a small atomic radius and the O or N atoms have only small effect of injection, the magnetization state survives in the region between the magnetic tracks. When O or N atoms are used for the injection, they add to the coercive force in the region between he magnetic tracks in consequence of nitridation or oxidation of the magnetic layer and cause blurring during the data being written in the magnetic track part. By contrast to the injection of atoms contemplated by this invention, the use of these atoms fails to demagnetize the magnetic layer or impart amorphousness to this layer.

This invention contemplates manufacturing a magnetic recording medium by placing in the magnetic layer a magnetic pattern designed in conformity with the distance between the tracks, removing the resist, reforming the protective layer on the exposed surface and applying a lubricant thereto.

This invention prefers to have the injection of atoms into the magnetic layer take place after the protective layer has been formed on the magnetic layer. By adopting this procedure, it is made possible to simplify the process of manufacture and augment productivity in consequence of obviating the necessity of forming the protective film after the injection of atoms and bring about the effect of suppressing the possibility of contamination during the course of manufacture of the magnetic recording medium. This invention allows the injection of atoms to occur either subsequent to the formation of the magnetic layer or prior to the formation of the protective film so as to form in the magnetic layer the non-magnetic part magnetically separating the magnetic recording tracks and the servo signal pattern parts.

The injection of the atoms, such as of Si, by the ion beam is implemented by the use of a commercially available ion implanter. This invention injects the atoms into the magnetic layer for the purpose of imparting amorphousness to the relevant portion of the crystal and enabling the injected atoms to be distributed homogeneously in the resultant amorphous portion and, therefore, is required to homogenize the depth of penetration of the atoms in the direction of thickness of the magnetic recording layer. The depth of penetration of atoms is fitly decided relative to the depth of penetration by the acceleration voltage of the ion implanter being used.

For the sake of forming the pattern subsequent to the application of the resist, the stamper is directly attached to the surface of the applied resist and depressed therein with high pressure as described above, with the result that the concavo-convex pattern in the form of tracks is formed on the resist surface. In this case, it deserves due attention that unduly strong pressure results in total loss of the concave part of the resist or an extreme decrease of the thickness of the film. The use of the concavo-convex pattern that is formed by etching using a thermosetting resin or a UV-setting resin is permissible for the sake of precaution.

As the stamper to be used for the process mentioned above, the stamper that has a very fine track pattern formed on a metal plate, for example, using a method, such as electron beam drawing, is available. The material used herein is required to possess hardness and durability capable of withstanding the process. While Ni is usable, for example, any other material may be used instead so long as it is capable of fulfilling the purpose mentioned above. On the stamper, servo signal patterns, such as burst pattern, grey cord pattern and preamble pattern, are formed besides the tracks that are recording ordinary data.

On the occasion of removing the resist, the resist on the surface and part of the protective film are removed using means, such as dry etching, reactive ion etching or ion milling. As a result of this treatment, the magnetic layer having formed the magnetic pattern thereon and part of the protective layer are left behind. By selecting the conditions, it may be made possible to effect complete removal up to the protective layer and leave behind the magnetic layer having formed a pattern intact.

For the formation of the component layers of the magnetic recording medium excepting the protective film layer 3, it is allowable to use means, such as the RF sputtering method and the DC sputtering method that are generally used as film-forming techniques.

For the formation of the protective film layer, generally the method for forming a film using a thin film of diamond-like carbon that is in popular use is adopted, though not necessarily.

Figure 2:
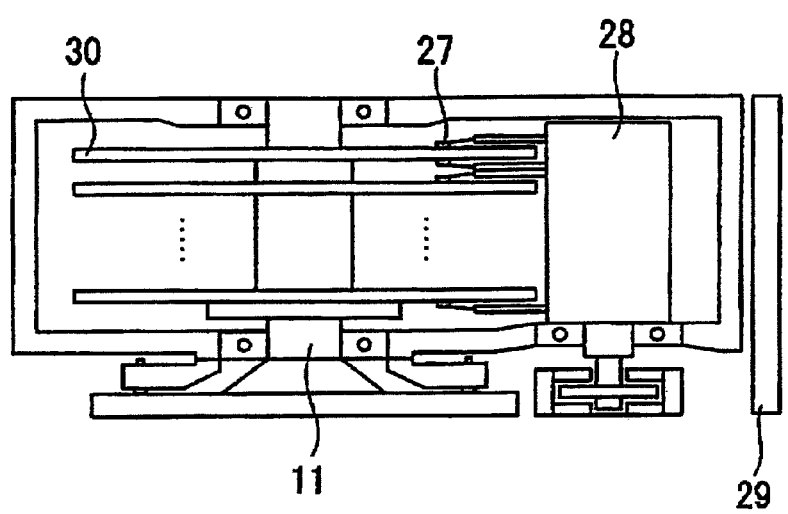
FIG. 2 is an explanatory view showing the configuration of the magnetic recording and reproduction device contemplated by the present invention.

The configuration of the magnetic recording and regeneration device contemplated by this invention is illustrated in FIG. 2. The magnetic recording and regeneration device of this invention comprises the magnetic recording medium 30 conforming to this invention and a recording and regenerating signal system 29 resulting from combining a medium-driving part 11 for driving the medium 30 in the direction of recording, a magnetic head 27 composed of a recording part and a regenerating part, a head-driving part 28 for causing the magnetic head 27 to be moved relative to the magnetic recording medium 30, and a recording and regenerating signal processing means for inputting a signal into the magnetic head 27 and regenerating the output signal from the magnetic head 27. This combination enables configuration of a magnetic recording device having high recording density. Owing to the fact that the recording tracks of the magnetic recording medium are in a magnetically discrete form, unlike the conventional technique adapted to cope with the exclusion of the influence of the magnetic transition region of the track edge part by giving to the regenerating head part a narrower width than the recording head, this invention allows both these parts to operate satisfactorily with substantially the same width. As a result, it is rendered possible to acquire a sufficient regeneration output and a high SNR.

By having the regenerating part of the magnetic head formed of a GMR head or a TMR head, it is made possible to obtain sufficient signal strength even at a high recording density and realize a magnetic recording device provided with high recording density. When the amount of buoyancy of this magnetic head is given a smaller height in the range of 0.005 μm to 0.020 μm than has been normal heretofore, it is made possible to obtain a device SNR of high output and provide a magnetic recording device of large capacity and high reliability. When the signal processing circuit in the method of maximum likelihood decoding is additionally incorporated in the combination, it is made possible to augment the recording density further and obtain the SNR that satisfactorily functions even when the track density exceeds 100 k tracks/inch, the linear recording density exceeds 1000 k bits/inch, and the recording density exceeds 100 G bits per square inch.

Now, the present invention will be described specifically below by reference to Examples and a Comparative Example, while these Examples will not limit this invention in any sense.

Comparative Example 1

A vacuum chamber having a glass substrate for an HD set therein was evacuated in advance to $1.0 \times 10^{-5}$ Pa or less. The glass substrate used herein was made of a crystallized glass material having the components of $Li_2Si_2O_5$, $Al_2O_3$—$K_2O$, $MgO$—$P_2O_5$ and $Sb_2O_3$—$ZnO$ and measured 65 mm in outside diameter, 20 mm in inside diameter and 2 Å in average surface roughness (Ra).

On the glass substrate, a soft magnetic layer of FeCoB, an intermediate layer of Ru and a magnetic layer of 70Co-5Cr-15Pt-10SiO$_2$ alloy were stacked by the DC sputtering method and a protective film layer of C and a fluorine-based lubricating film were stacked by the P-CVD method, invariably in thin films sequentially in the order mentioned. In thickness, the FeCoB soft magnetic layer measured 600 Å, the Ru intermediate layer 100 Å, the magnetic layer 150 Å and the C protecting film layer an average of 4 nm. Thereafter, the magnetic layer was subjected to the die molding processing to form the magnetic pattern. The layer was coated with SOG resist and a concavo-convex shape conforming to an expected pattern was formed in the layer of the resist. The thickness of the resist in the convex part was 150 nm and the thickness of the resist in the concave part was absolute zero. Then, Ar$^+$ atoms were placed in the resist layer by the ion beam technique. The conditions of the ion beam technique, such as the amount of implantation and the accelerated voltage, were as shown in Table 1. The produced magnetic recording medium had a structure as illustrated in FIG. 1. The width W of the magnetic layer was 100 nm and the width L of the non-magnetic layer was 100 nm.

Examples 1-3

A magnetic recording medium was manufactured by following the procedure of Comparative Example 1. When the SOG resist was applied and a concavo-convex shape conforming to an expected pattern was formed in the applied layer of resist, the resist was left behind in the concave part that had a thickness of 10-50 nm.

The conditions for the ion implantation were as shown in Table 1.

The conditions of the ion beam, such as the amount of implantation and the accelerated voltage must be determined in advance by a preparatory experiment. Also, the conditions for demagnetizing the magnetic layer and the conditions for imparting amorphousness to the magnetic layer must be determined in advance by an X-ray diffraction measurement or an electron diffraction measurement.

The samples of Examples 1-3 and Comparative Example 1 were evaluated for the electromagnetic conversion characteristic by using a spinstand. As the head for this evaluation, a vertical recording head was used for recording and a TuMR head was used for reading. The recording of a signal of 750 KFCI was tested for an SNR value and a 3 T-squash. The results showed that the samples of Examples 1-3 were greatly improved in RW properties, such as an SNR and a 3 T-squash, as compared with the sample of Comparative Example 1. This improvement may be explained by supposing that the head exhibited stable buoyancy and allowed RW at a prescribed height of buoyancy and that the magnetized state was completely eliminated from the region between the magnetic tracks. The confirmation of the RW properties, such as the SNR and the 3 T-squash, leads to a confirmation that the samples of Examples 1-3 exhibited visually discernible separation of the adjacent tracks by the non-magnetic part and the magnetic patterns of the magnetic part and the non-magnetic part conforming to the shape of pattern of the resist formed in a concavo-convex shape were produced in the magnetic layer part of the sample of Example 1 by the ion implantation by an ion beam.

Subsequent to the completion of the test for electromagnetic conversion characteristic, the samples of Examples 1-3 and Comparative Example 1 were tested for surface roughness by using an AFM. With the AMF produced by Digital Instruments Corporation, the magnetic substrates prepared in Examples 1-3 and Comparative Example 1 for use in a vertical magnetic recording medium were evaluated for surface roughness (Ra) in a field of vision of 10 µm. The other settings were 256×256 tapping mode in resolution and 1 µm/sec in sweep rate. The results were as shown in Table 1 below. The samples of Examples 1-3 exhibited markedly low surface roughness as compared with the sample of Comparative Example 1, a fact suggesting that the buoyancy of head was stabilized.

The samples of Examples 1-3 and Comparative Example 1 were evaluated for the glide avalanche characteristics. The evaluation was carried out with a device made by Sony/Tektronix Corporation and marketed under the product code of DS4100 using a 50% slider head made by Glidewrite Inc. The results of the test were as shown in Table 1 below. It is clear from the results that the samples of Examples 1-3 exhibited low glide avalanche and high property of head buoyancy.

TABLE 1

| | Thickness of resist concave part (nm) | Ion-beam Ar-accelerated voltage/ irradiation time | SNR (dB) | 3T-squash (%) | Ra (nm) | Glide avalanche |
|---|---|---|---|---|---|---|
| Ex. 1 | 10 | 50 keV/600 sec | 12.1 | 82.2 | 0.32 | 5.5 |
| Ex. 2 | 20 | 50 keV/600 sec | 11.8 | 82.2 | 0.33 | 5.4 |
| Ex. 3 | 50 | 50 keV/600 sec | 11.9 | 82.2 | 0.31 | 5.8 |
| Comp. Ex. 1 | 0 | 50 keV/600 sec | 10.3 | 72.1 | 10.0 | 13.4 |

INDUSTRIAL APPLICABILITY

This invention allows provision of a magnetic recording medium that secures stable buoyancy of a head, exhibits an outstanding ability of separating a magnetic recording pattern, shuns the influence of signal interference between the adjacent patterns and excels in the property of retaining high recording density. It also contributes greatly to augmenting productivity because it permits omitting a dry etching process directed toward removing the magnetic layer out of the magnetic layer-processing die heretofore held to entail a very complex procedure.

The invention claimed is:
1. A method for manufacturing a magnetic recording medium, comprising the steps of:
   depositing a magnetic layer on at least one of surfaces of a nonmagnetic substrate; and
   injecting atoms partially in the magnetic layer, thereby demagnetizing parts having admitted the injected atoms or imparting amorphousness thereto, to form a magnetically separated magnetic recording pattern;

wherein the step of injecting includes the steps of applying resist to the at least one surface subsequent to the step of depositing the magnetic layer, partially decreasing a thickness of the resist and irradiating a surface of the resist with atoms, thereby inducing partial injection of the atoms to the magnetic layer through portions of the resist decreased in thickness.

2. A method for manufacturing a magnetic recording medium according to claim 1, wherein the step for partially decreasing is accomplished by transferring to the surface of the resist a convexo-concave shape formed on a surface of a stamp.

3. A method for manufacturing a magnetic recording medium according to claim 1, wherein the step for partially decreasing is accomplished by partially etching the surface of the resist.

4. A method for manufacturing a magnetic recording medium according to claim 1, wherein the portions of the resist decreased in thickness have a thickness in a range of 1 nm to 150 nm.

5. A method for manufacturing a magnetic recording medium according to claim 1, wherein the portions of the resist decreased in thickness have a width of 100 nm or less and other portions of the resist have a width of 200 nm or less.

6. A method for manufacturing a magnetic recording medium according to claim 1, further comprises the step of forming a protective layer on the magnetic layer before the step of applying resist, wherein the resist is applied onto the protective layer.

7. A method for manufacturing a magnetic recording medium according to claim 1, wherein the atoms injected are those of at least one element selected from the group consisting of B, P, Si, F, N, H, C, In, Bi, Kr, Ar, Xe, W, As, Ge, Mo and Sn.

8. A method for manufacturing a magnetic recording medium according to claim 7, wherein the atoms injected are those of the Kr or Si.

9. A method for manufacturing a magnetic recording medium according to claim 1, wherein the magnetic layer has a thickness in a range of 3 to 20 nm.

* * * * *